United States Patent
Ando (10) Patent No.: US 8,248,646 B2
(45) Date of Patent: Aug. 21, 2012

(54) DATA TRANSMISSION DEVICE INCLUDING IMAGE ACQUIRING UNIT, AND METHOD AND COMPUTER READABLE MEDIUM THEREFOR

(75) Inventor: Satoko Ando, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 705 days.

(21) Appl. No.: 12/406,766

(22) Filed: Mar. 18, 2009

(65) Prior Publication Data

US 2009/0244612 A1 Oct. 1, 2009

(30) Foreign Application Priority Data

Mar. 28, 2008 (JP) ................. 2008-088068

(51) Int. Cl.
*G06F 3/12* (2006.01)
*G06K 15/00* (2006.01)
*H04N 1/00* (2006.01)
(52) U.S. Cl. ............... 358/1.15; 358/1.16; 358/405
(58) Field of Classification Search .............. None
See application file for complete search history.

(56) References Cited

U.S. PATENT DOCUMENTS

| | | | |
|---|---|---|---|
| 6,374,291 B1 | 4/2002 | Ishibashi et al. | |
| 2005/0111051 A1* | 5/2005 | Uchikawa | 358/448 |
| 2006/0039037 A1 | 2/2006 | Shibata | |
| 2008/0133607 A1* | 6/2008 | Tanaka et al. | 707/104.1 |

FOREIGN PATENT DOCUMENTS

| | | |
|---|---|---|
| JP | H09-325924 A | 12/1997 |
| JP | H10-233880 A | 9/1998 |
| JP | 2000-083119 A | 3/2000 |
| JP | 2000-341454 A | 12/2000 |
| JP | 2002-074321 A | 3/2002 |
| JP | 2003-087479 A | 3/2003 |
| JP | 2003-143356 A | 5/2003 |
| JP | 2003-333305 A | 11/2003 |
| JP | 2004-102549 A | 4/2004 |
| JP | 2006-060499 A | 3/2006 |
| JP | 2006-295750 A | 10/2006 |
| JP | 2008-071050 A | 3/2008 |

OTHER PUBLICATIONS

Japan Patent Office; Notification of Reasons of Rejection in Japanese Patent Application No. 2008-088068 (counterpart to the above captioned U.S. application ) mailed May 18, 2010.

* cited by examiner

*Primary Examiner* — Twyler Haskins
*Assistant Examiner* — Barbara Reinier
(74) *Attorney, Agent, or Firm* — Baker Botts L.L.P.

(57) ABSTRACT

A data transmission device, configured to be connected with terminal devices via a network, includes an image acquiring unit configured to acquire image data, an identifying data acquiring unit configured to acquire user identifying data to identify a user of the data transmission device, a first file creating unit configured to create a first file that includes the image data acquired by the image acquiring unit, a second file creating unit configured to create a second file that includes the user identifying data acquired by the identifying data acquiring unit and data to specify the first file created by the first file creating unit, and a transmission unit configured to transmit the first file and the second file to a destination one of the terminal devices.

17 Claims, 5 Drawing Sheets

PROFILE

| USER ID | E-MAIL ADDRESS | OPTION |
|---|---|---|
| User_1 | User_1@xxx.yyy | COLOR |
| ⋮ | ⋮ | ⋮ |

DATA TRANSMISSION DEVICE INCLUDING IMAGE ACQUIRING UNIT, AND METHOD AND COMPUTER READABLE MEDIUM THEREFOR

CROSS-REFERENCE TO RELATED APPLICATION

This application claims priority under 35 U.S.C. §119 from Japanese Patent Application No. 2008-088068 filed on Mar. 28, 2008. The entire subject matter of the application is incorporated herein by reference.

BACKGROUND

1. Technical Field

The following description relates to one or more techniques for transmitting data to a destination one of terminal devices via a network so that a user of the destination terminal device can easily manage the data transmitted.

2. Related Art

An image scanner has been known as a data transmission device, which has a function to transmit data created by scanning images to terminal devices via a network (for example, see Japanese Patent Provisional Publication No. 2006-60499). A representative example of such a function has been known as "Scan to CIFS (Common Internet File System)" in a field of network communication conforming to the TCP/IP protocol.

SUMMARY

The image scanner is adopted to set as a destination of the scanned image data a common folder set in each of the terminal devices connected therewith via the network and to store the image data in the common folder. Here, the "common folder" is a folder accessible from (external) terminal devices other than the terminal devices having storages in each of which the common folder is set. Namely, when the common folder exists, an external terminal device can access a file stored in the common folder and store a new file into the common folder.

A user of the image scanner may store the image data into the common folder of a terminal device used by another user, with or without the intension to do so. In this case, when previously informed that the image data is stored into the common folder of the destination terminal device, the user of the destination terminal device can specify which user stores the image data into the common folder. However, when not previously informed that the image data is stored into the common folder of the destination terminal device, or when the destination to which the image data is to be transmitted is set without the intension (namely, mistakenly), the user of the terminal device into which the image data is unilaterally stored cannot know which user stores the image data or thus how the image data should be treated.

Aspects of the present invention are advantageous to provide one or more improved data transmission devices, methods, and computer readable media that make it possible to specify a user who instructs the data transmission device to transmit data created thereby, at a side of a terminal device that receives the data.

According to aspects of the present invention, a data transmission device configured to be connected with terminal devices via a network is provided, which data transmission device includes an image acquiring unit configured to acquire image data, an identifying data acquiring unit configured to acquire user identifying data to identify a user of the data transmission device, a first file creating unit configured to create a first file that includes the image data acquired by the image acquiring unit, a second file creating unit configured to create a second file that includes the user identifying data acquired by the identifying data acquiring unit and data to specify the first file created by the first file creating unit, and a transmission unit configured to transmit the first file and the second file to a destination one of the terminal devices.

In some aspects of the present invention, the data transmission device configured as above transmits the first file and the second file to a destination terminal device. The second file is created separately from the first file. Accordingly, a user of the destination terminal device can easily identify a user who has instructed the data transmission device to acquire the image data, namely, a user who has transmitted the image data to the destination terminal device by confirming the second file transmitted.

According to aspects of the present invention, further provided is a method for a data transmission device configured to be connected with terminal devices via a network, which method includes the step of acquiring image data, acquiring user identifying data to identify a user of the data transmission device, creating a first file that includes the image data acquired, creating a second file that includes the user identifying data acquired and data to specify the first file created, and transmitting the first file and the second file to a destination one of the terminal devices.

In some aspects of the present invention, the method adopted as above can provide the same effects as those of the aforementioned data transmission device.

According to aspects of the present invention, further provided is a computer readable medium having computer readable instructions stored thereon to be executed by a data transmission device configured to be connected with terminal devices via a network, the instructions causing the data transmission device to perform the step of acquiring image data, acquiring user identifying data to identify a user of the data transmission device, creating a first file that includes the image data acquired, creating a second file that includes the user identifying data acquired and data to specify the first file created, and transmitting the first file and the second file to a destination one of the terminal devices.

In some aspects of the present invention, the computer readable medium adopted as above can also provide the same effects as those of the aforementioned data transmission device.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Referring to the accompanying drawings, an image scanner in an embodiment will be described. The image scanner in the first embodiment is a Multi-Function Device (MFD) 10 that has a facsimile function, a copy function, and a printer function, as well as a scanner function.

1. System Configuration

Figure 1:
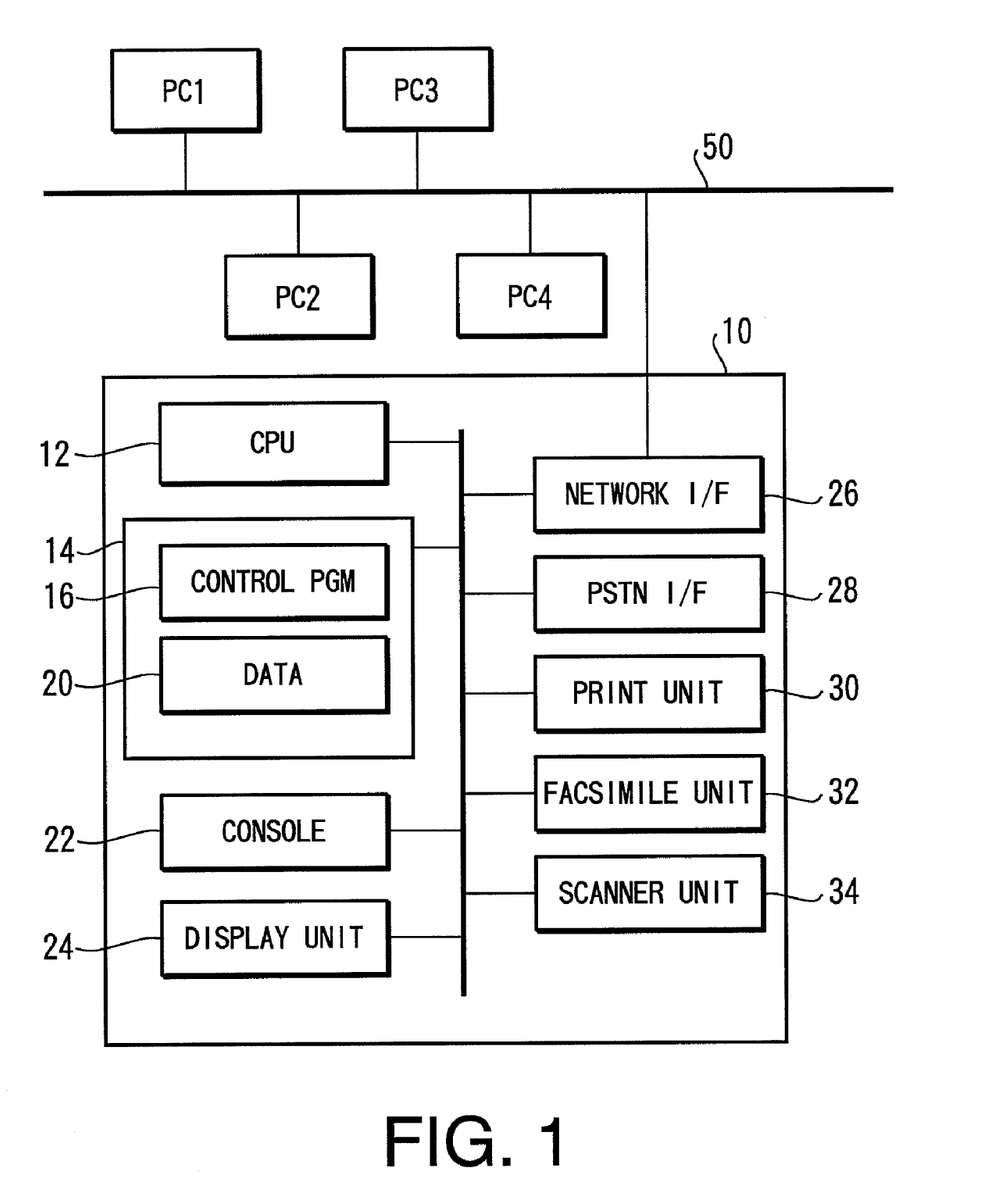
FIG. 1 is a block diagram schematically showing a configuration of a Multi-Function Device (MFD) connected with terminal devices via a network in an embodiment according to one or more aspects of the present invention.

FIG. 1 is a block diagram of the MFD 10. There are as well drawn a plurality of terminal devices (a PC 1, a PC 2, a PC 3, and a PC 4) connected with the MFD 10 via a Local Area Network (LAN) 50. The MFD 10 and the terminal devices are configured to communicate with each other via the LAN 50.

The MFD 10 is provided with a CPU 12, a storage 14, a console 22, a display device 24, a network interface 26, a Public Switched Telephone Networks (PSTN) interface 28, a print unit 30, a facsimile unit 32, and a scanner unit 34. Characters "I/F" shown in FIG. 1 denote "interface." In addition, characters "PGM" shown in FIG. 1 denotes "program."

The CPU 12 is configured to control the MFD 10 in accordance with various programs stored on the storage 14. The storage 14 stores various sorts of data 20 as well. The data 20 includes data referred to as a profile. The console 22 is hardware adopted to accept a user instruction such as an instruction to scan an image therethrough.

The network interface 26 is hardware adopted to communicate with the terminal devices via the LAN 50. The PSTN interface 28 is hardware adopted to establish a connection of the MFD 10 with a public telephone line (not shown) therethrough. The MFD 10 can perform facsimile data communication via the public telephone line. The print unit 30 is hardware for the print function. The facsimile unit 32 is hardware for the facsimile function. The scanner unit 34 is hardware for the scanner function.

2. General Overview of Process to be Executed by MFD

Figure 2:
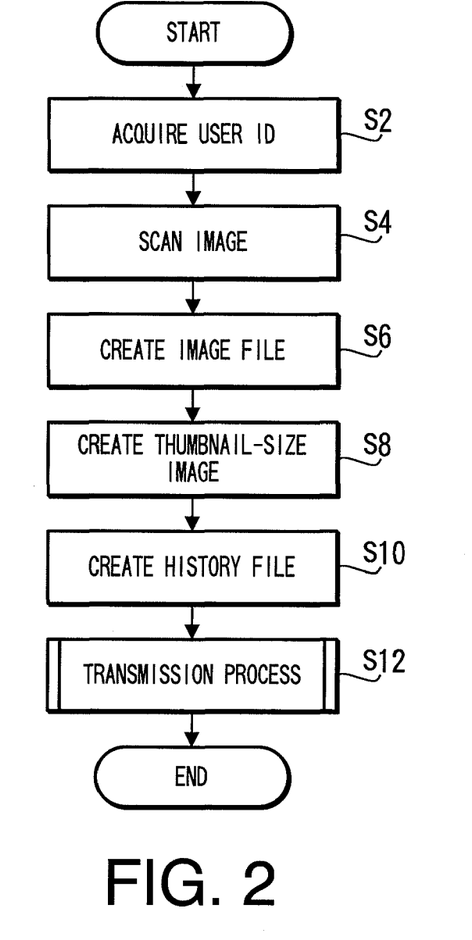
FIG. 2 is a flowchart showing a process to be executed by the MFD in the embodiment according to one or more aspects of the present invention.

A general overview of a process will be described, in which process the MFD 10 scans an image based on a user instruction and transmits the image data scanned to a user intended terminal device. FIG. 2 is a flowchart of a process to be executed by the MFD 10. It is noted that the process shown in FIG. 2 is written in a control program 16. A user inputs a user ID as well as an instruction to scan an image. In other words, the MFD 10 acquires a user ID as well as an instruction to scan an image (S2). The user ID is data to specify the user of the MFD 10. The MFD 10 may accept a password to certify the user along with the user ID.

Figure 3:
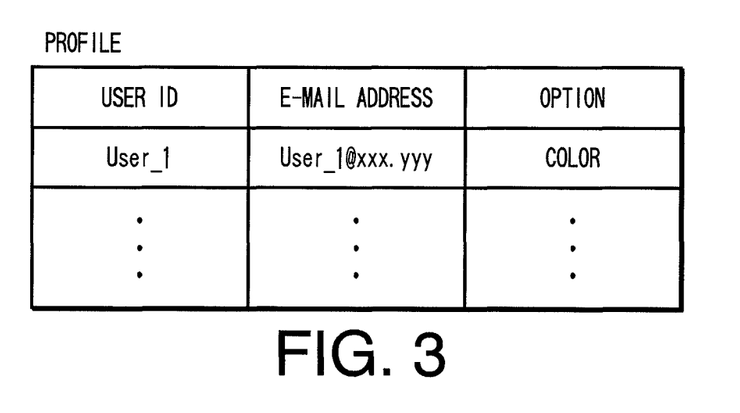
FIG. 3 exemplifies a profile in the embodiment according to one or more aspects of the present invention.

Based on the user ID acquired, the MFD 10 specifies information regarding the user, settings for scanning the image, and a terminal device to which the image data is to be transmitted. The above sorts of information to be specified are written in the profile. FIG. 3 exemplifies the profile. The profile stores user IDs each of which is associated with an e-mail address of a user and a setting for scanning an image (see the item "Option" in FIG. 3). For example, in the profile shown in FIG. 3, a user ID "User_1" is associated with an e-mail address "User_1@xxx.yyy" and an optional setting "Color." Namely, the MFD 10 stores data (a profile) that includes a user ID associated with a terminal device of a user (an e-mail address). The optional setting item "Color" denotes an instruction to scan an image in a color mode. In the item "Option," there is written information such as a file format of a file including image data scanned and resolution. An e-mail address written in a profile can be represented in other words as user terminal data that specifies a terminal device associated with a user ID. In further other words, a profile associates a user ID with a terminal device (a terminal device specified by an e-mail address).

In response to the user instruction to scan an image, the MFD 10 scans the image based on the settings written in the profile (S4). The MFD 10 creates an image file that includes the image data scanned (S6). The image file may be created based on the jpeg format or the TIFF format. The MFD 10 sets, as a name of the image file, a name that includes the date and time when the image file is created and an arbitrary character string. It is noted that the steps S8 and S10 to be subsequently explained are actually executed in a transmission process in S12. FIG. 2 indicates the steps S8 and S10 in front of the transmission process (S12) for the sake of convenience and easy understanding. The MFD 10 creates a thumbnail-size image (a reduced image) of the image data acquired in S4 (S8). Subsequently, the MFD 10 creates a user ID, a file name of the image file (data to specify the image file), and a history file that includes the thumbnail-size image (S10). The history file is a separate file from the image data.

The MFD 10 stores a destination list in which destinations of the plurality of terminal devices are listed. The destination list may be a so-called "address book." The user specifies a terminal device as a destination of the image file from the destination list. The MFD 10 transmits the image file and the history file to the destination specified by the user (S12). It is noted that the destination includes data to specify the destination terminal device and data to specify the common folder of the destination terminal device. For example, the destination is written as "PC1¥Folder," where "PC1" represents the data to specify the destination terminal device and "Folder" represents the common folder.

Figure 4:
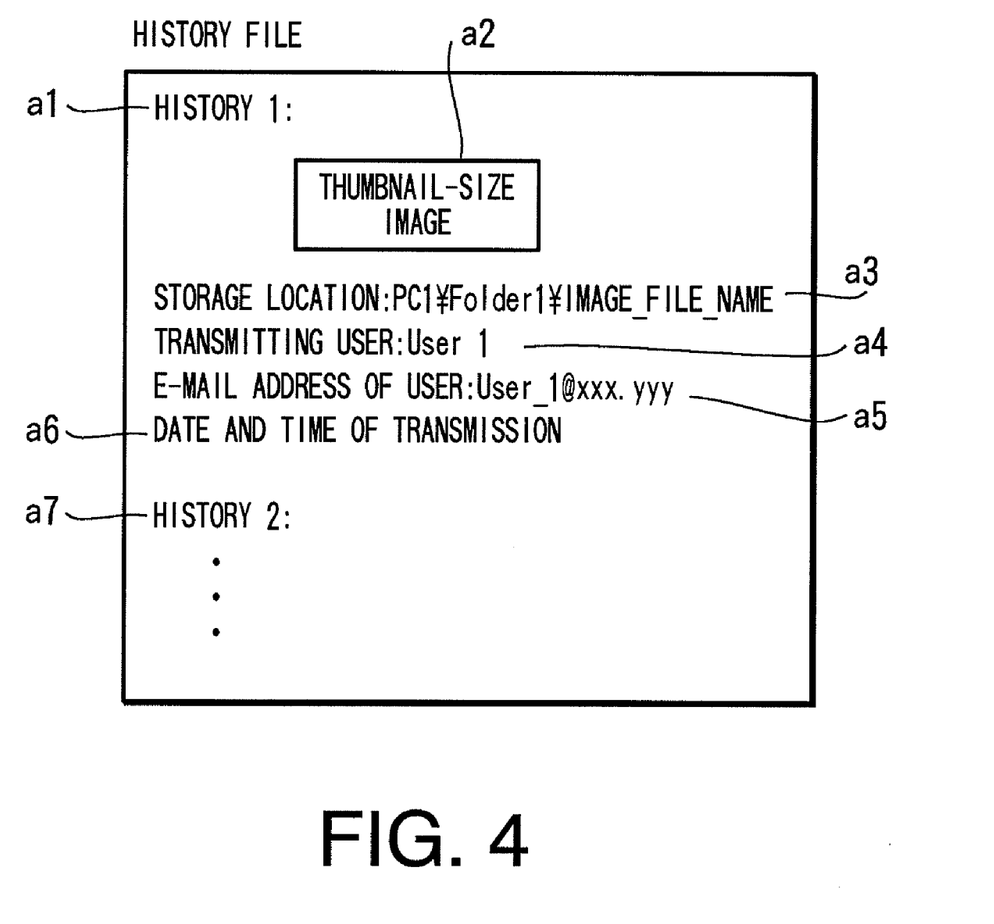
FIG. 4 exemplifies a history file in the embodiment according to one or more aspects of the present invention.

The history file created by the MFD 10 will be described. FIG. 4 exemplifies the history file. Information regarding the image data scanned this time is written in an item "History 1" (a1) of the history file. In an item "History 2" (a7) of the history file, information regarding image data previously scanned. Namely, the history file as a single file contains the information regarding the image data scanned this time and the information regarding the image data previously scanned. The history file further includes the thumbnail-size image created in S8 (a2), the file name and the storage location of the image file (a3), the user ID acquired in S2, namely, the data to specify the user of the MFD 10 (a4), the e-mail address associated with the user ID (a5), and the date and time when the image is scanned, namely, the date and time when the image file is transmitted (a6). The e-mail address (a5) is specified based on the profile. The storage location (a3) included in the history file will be described later. For the thumbnail-size image (a2) and the storage location (a3), a hyperlink to the image file is set based on the storage location of the image file (a3).

3. Explanation of Transmission Process

Figure 5:
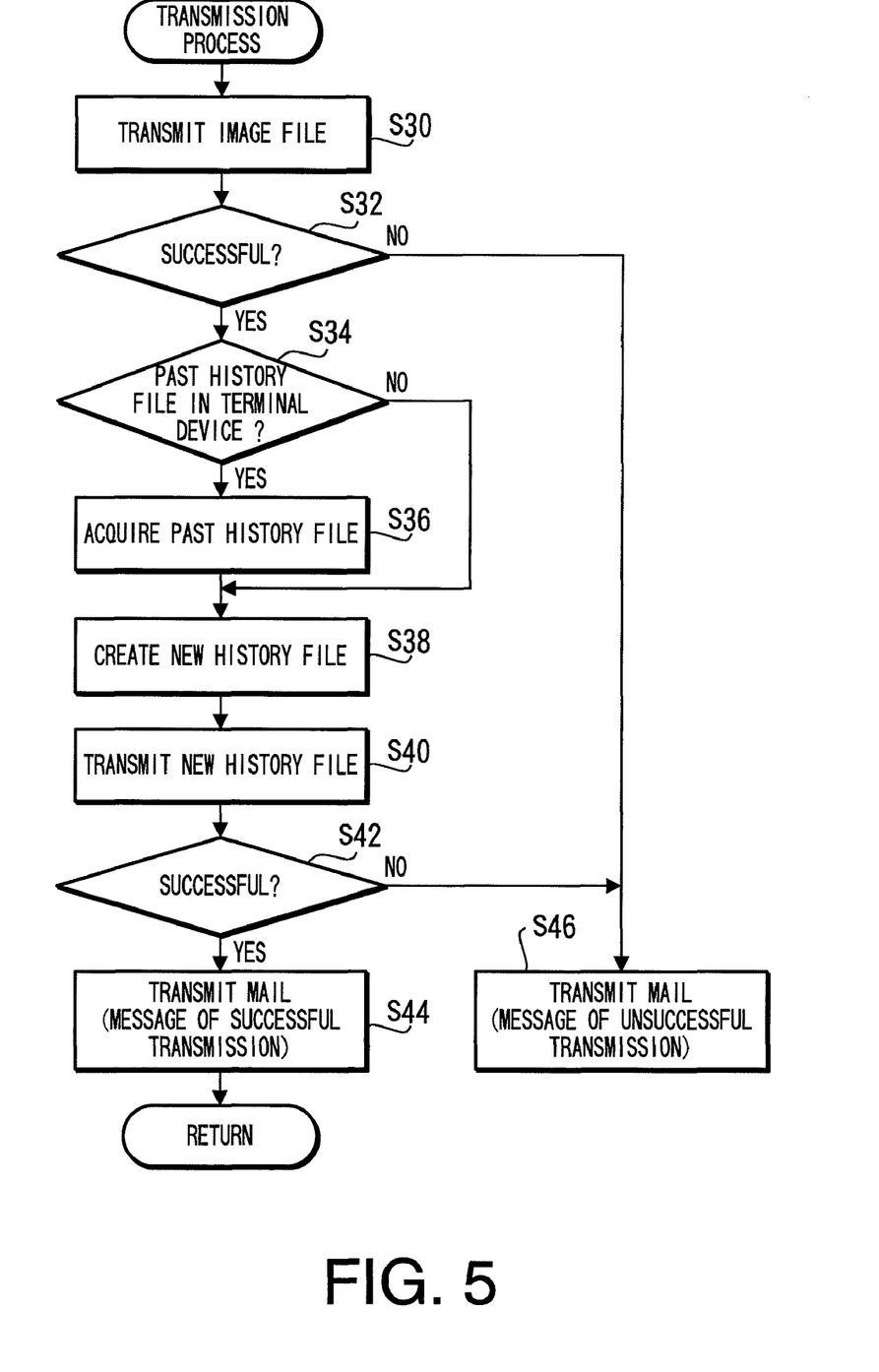
FIG. 5 is a flowchart showing a transmission process to be executed by the MFD in the embodiment according to one or more aspects of the present invention.

The transmission process (S12) in the flowchart shown in FIG. 2 will be described. FIG. 5 is a flowchart of the transmission process. The MFD 10 first transmits the image file created in S6 (see FIG. 2) to the terminal device of the destination specified by the user (S30). When receiving the image file, the destination terminal device returns a message representing successful receipt of the image file to the MFD 10. By receiving the message, the MFD 10 determines that the image file is successfully transmitted (S32: Yes). The message contains information regarding the storage location of the image file. Namely, the message can be expressed in other words as storage location data to specify the storage location of the image file. The storage location (a3 in FIG. 4) included in the aforementioned history file is written based on the message. Specifically, the MFD 10 receives the storage location data to specify the storage location of the image file, and creates the history file containing the hyperlink to the image file based on the storage location data received.

When successfully receiving the image file, the terminal device as the destination of the image file returns the message representing that. In this respect, however, when the terminal device is configured not to return the above message (the storage location data to specify the storage location of the image file), data based on the specified destination and the file name of the image file created in S6 may be written for the storage location (a3 in FIG. 4) of the history file. Any of the destination and the file name is data stored on the MFD 10. Therefore, even though the storage location data is not sent by the destination terminal device, the MFD 10 can write the storage destination (a3 in FIG. 4) in the history file. Further, the MFD 10 may create the history file containing the hyperlink to the image file based on the storage destination (a3 in FIG. 4).

When failing to send the image file (S32: No), the MFD 10 transmits a message representing failure in transmission of the image data to the e-mail address associated with the user ID in the profile (S46).

When the image file is successfully transmitted (S32: Yes), the MFD 10 determines whether a past history file remains saved in the destination terminal device (S34). A predetermined character string such as "History" is assigned to the file name of the history file. The MFD 10 can confirm the existence of the past history by checking whether there is a file including the character string. The character string is stored on the storage 14. When the past history file remains saved in the destination terminal device (S34: Yes), the MFD 10 acquires the past history file from the terminal device (S36). Then, the MFD 10 creates a new history file by adding to the past history file information regarding the image data successfully transmitted this time (S38). The new history file is given the same file name as the past history file. The information regarding the image data transmitted this time denotes the history 1 (a1) shown in FIG. 4. When the past history file does not remain saved in the destination terminal device (S34: No), the MFD 10 creates a whole new history file including the information regarding the image data transmitted this time (S38). The MFD 10 stores a file name of the created history file into the storage 14. Additionally, in S38, the MFD 10 creates a thumbnail-size image by reducing the image data.

The MFD 10 creates the history file on the basis of the file name of the history file stored on the storage 14 regardless of the user ID acquired in S2 (see FIG. 2) (S38). Specifically, the MFD 10 does not create a history file for each of different user IDs. Thus, it is possible to prevent a history file from being needlessly created in a storage destination.

Further, when acquiring the history file in S36, the MFD 10 acquires an attribute of the history file as well. Referring to the attribute of the history file, the MFD 10 determines whether "write inhibit" is set in the past history file. When "write inhibit" is set, the MFD 10 creates a whole new history file in S38. The whole new history file is given a file name created by adding a number to the file name of the past history file.

Subsequently, the MFD 10 transmits the history file created in S38 to the terminal device of the destination specified by the user (S40). Namely, the MFD 10 transmits the history file to the same storage location as the storage location of the image file. When the history file is successfully transmitted (S42: Yes), the MFD 10 automatically sends a message representing successful transmission of the image file and the history file to the e-mail address associated with the user ID (S44). Meanwhile, when failing to transmit the history file (S42: No), the MFD 10 automatically sends a message representing failure in transmission of the history file to the e-mail address associated with the user ID (S46).

The MFD 10 has the following advantages.

(1) The MFD 10 creates the history file separate from the image file. The history file and the image file are sent to the same storage location. A user of a destination terminal device can specify a user who has sent the image file by referring to the history file. The history file contains the thumbnail-size image (reduced image) of the image data. Although the history file is created separately from the image file, the user of the destination terminal device can confirm the image data by referring to the history file.

(2) The history file includes the thumbnail-size image (a2) of the image data, and the file name of the image file (a3). To the thumbnail-size image (a2) and the file name of the image file (a3), the hyperlink to the image file is assigned. When the user of the terminal device in which the history file and the image file are stored clicks the thumbnail-size image (a2) or the file name (a3) included in the history file, the image file is displayed on the terminal device. The hyperlink enables the user of the terminal device to open the image file from on the history file.

(3) To the e-mail address (a5) associated with the user ID, a hyperlink to a mail application is assigned. The hyperlink assigned to the e-mail address is information to launch an application for sending a message to the terminal device corresponding to the user ID. When the user of the terminal device which stores the history file clicks the e-mail address (a5) written in the history file, the mail application associated with the e-mail address through the hyperlink is launched. The hyperlink simplifies operations required for the user of the terminal device to transmit a message to a user who has sent the image file.

(4) The MFD 10 stores the profile in which the user ID is associated with the e-mail address and the storage location of the image file. Therefore, the user can designate the storage location of the image file by inputting the user ID.

(5) When the image file is successfully transmitted (S32: Yes), the MFD 10 sends the history file (S40). Thus, it is possible to prevent the MFD 10 from sending the history file though the MFD 10 fails to transmit the image file.

(6) When there is a past history file already saved in the terminal device as the destination of the image file, the MFD 10 adds, to the past history file, a user ID and data (a file name) to specify a new image file. Accordingly, it is possible to prevent the MFD 10 from creating another history file even though the number of image files increases.

Figure 6:
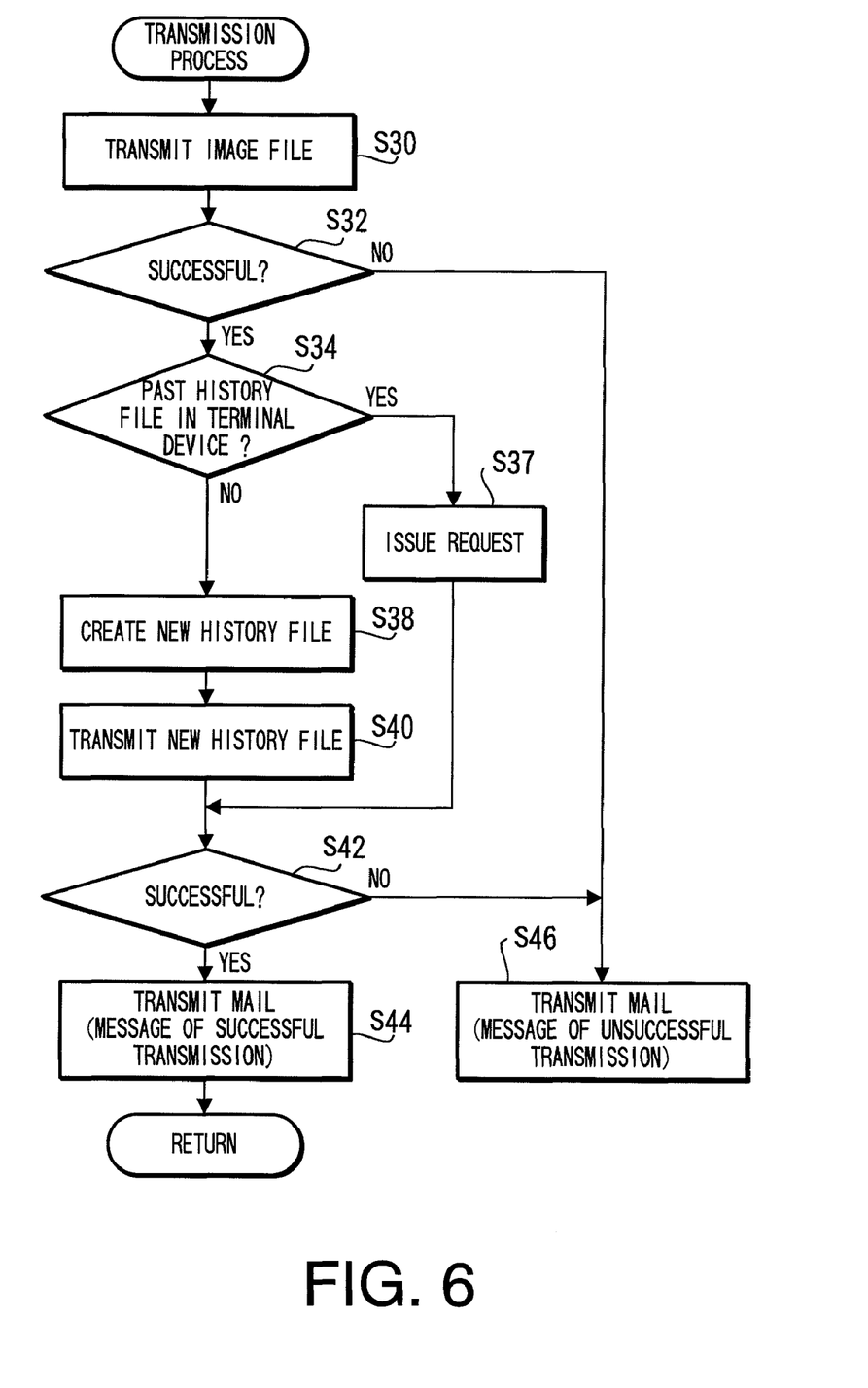
FIG. 6 is a flowchart showing another transmission process to be executed by the MFD in the embodiment according to one or more aspects of the present invention.

The MFD 10 may be provided with the following function. When there is a past history file saved in the terminal device (S34: Yes), the MFD 10 may perform an operation of S37 as shown in FIG. 6, instead of executing the steps S36, S38, and S40 in FIG. 5. Specifically, in S37, a command is issued to the terminal device, which command requests the terminal device to add, to the past history file already saved, contents of a history file to be newly created (i.e., information to specify the image file and information to identify the user).

The MFD 10 of the aforementioned embodiment creates the history file that includes the storage location data to indicate the storage location of the image file and the thumbnail-size image data created by reducing the scanned image data. However, the MFD 10 may create a history file that contains at least one of the storage location data and the thumbnail-size image data.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A data transmission device configured to be connected with terminal devices via a network, comprising:
    an image acquiring unit configured to acquire image data;
    an identifying data acquiring unit configured to acquire user identifying data to identify a user of the data transmission device;
    a first file creating unit configured to create a first file that includes the image data acquired by the image acquiring unit;
    a second file creating unit configured to create a second file that includes the user identifying data acquired by the identifying data acquiring unit and data to specify the first file created by the first file creating unit;
    a transmission unit configured to transmit the first file and the second file to a destination one of the terminal devices; and
    a receiving unit configured to receive storage location data from the destination terminal device to specify a storage location of the first file when the first file is successfully transmitted to the destination terminal device,
    wherein the second file creating unit is configured to create the second file that further includes link information regarding a link to the first file based on the storage location data received by the receiving unit.

2. The data transmission device according to claim 1,
    wherein the second file further includes at least one of storage location data and reduced image data, the storage location data being data to specify a storage location of the first file, the reduced image data being created by reducing the image data acquired.

3. The data transmission device according to claim 1, further comprising a storage configured to store user terminal data to specify a terminal device associated with the user identifying data,
    wherein the second file creating unit is configured to create the second file that further includes link information regarding a link to an application adopted to send a message to the terminal device specified by the user terminal data stored in the storage.

4. The data transmission device according to claim 1,
    wherein the second file creating unit is configured to create the second file when the first file is successfully transmitted to the destination terminal device, and
    wherein the transmission unit is configured to transmit the second file to a terminal device identical to a terminal device to which the first file is to be transmitted.

5. The data transmission device according to claim 1,
    wherein the transmission unit is configured to transmit the first file and the second file to a common storage location.

6. The data transmission device according to claim 1, further comprising:
    a determining unit configured to determine whether there is a second file stored on the destination terminal device; and
    a second file acquiring unit configured to, when the determining unit determines that there is a second file stored on the destination terminal device, acquire the second file from the destination terminal device,
    wherein the second file creating unit is configured to create a new second file that includes contents of the second file acquired by the second file acquiring unit, and
    wherein the transmission unit is configured to transmit the new second file created by the second file creating unit.

7. The data transmission device according to claim 1, further comprising:
    a determining unit configured to, when the first file is successfully transmitted to the destination terminal device, determine whether there is a second file stored on the destination terminal device; and
    a requesting unit configured to, when the determining unit determines that there is a second file stored on the destination terminal device, request the destination terminal device to add to the second file stored on the destination terminal device contents of a second file to be newly created along with the transmission of the first file.

8. The data transmission device according to claim 1,
    wherein the image acquiring unit includes a scanner configured to scan an image and create the image data of the scanned image.

9. A method for a data transmission device configured to be connected with terminal devices via a network, comprising the step of:
    acquiring image data;
    acquiring user identifying data to identify a user of the data transmission device;
    creating a first file that includes the image data acquired;
    creating a second file that includes the user identifying data acquired and data to specify the first file created;
    transmitting the first file and the second file to a destination one of the terminal devices; and
    receiving storage location data to specify a storage location of the first file from the destination terminal device when the first file is successfully transmitted to the destination terminal device,
    wherein the second file further includes link information regarding a link to the first file based on the storage location data received.

10. The method according to claim 9,
    wherein the second file further includes at least one of storage location data and reduced image data, the storage location data being data to specify a storage location of the first file, the reduced image data being created by reducing the image data acquired.

11. The method according to claim 9, wherein the data transmission device further comprises a storage configured to store user terminal data to specify a terminal device associated with the user identifying data, and
wherein the step of creating the second file is adopted to create the second file that further includes link information regarding a link to an application adopted to send a message to the terminal device specified by the user terminal data stored in the storage.

12. The method according to claim 9,
wherein the step of creating the second file is adopted to create the second file when the first file is successfully transmitted to the destination terminal device, and
wherein the step of transmitting the first file and the second file is adopted to transmit the second file to a terminal device identical to a terminal device to which the first file is to be transmitted.

13. The method according to claim 9,
wherein the step of transmitting the first file and the second file is adopted to transmit the first file and the second file to a common storage location.

14. The method according to claim 9, further comprising the steps of:
determining whether there is a second file stored on the destination terminal device; and
when it is determined that there is a second file stored on the destination terminal device, acquiring the second file from the destination terminal device,
wherein the step of creating the second file is adopted to create a new second file that includes contents of the second file acquired by the second file acquiring unit, and
wherein the step of transmitting the first file and the second file is adopted to transmit the new second file created.

15. The method according to claim 9, further comprising the steps of:
when the first file is successfully transmitted to the destination terminal device, determining whether there is a second file stored on the destination terminal device; and
when it is determined that there is a second file stored on the destination terminal device, requesting the destination terminal device to add to the second file stored on the destination terminal device contents of a second file to be newly created along with the transmission of the first file.

16. The method according to claim 9,
wherein the step of acquiring the image data includes the steps of scanning an image and creating the image data of the scanned image.

17. A non-transitory computer readable medium having computer readable instructions stored thereon to be executed by a data transmission device configured to be connected with terminal devices via a network, the instructions causing the data transmission device to perform the step of:
acquiring image data;
acquiring user identifying data to identify a user of the data transmission device;
creating a first file that includes the image data acquired;
creating a second file that includes the user identifying data acquired and data to specify the first file created;
transmitting the first file and the second file to a destination one of the terminal devices; and
receiving storage location data to specify a storage location of the first file from the destination terminal device when the first file is successfully transmitted to the destination terminal device,
wherein the second file further includes link information regarding a link to the first file based on the storage location data received.

* * * * *